United States Patent

Pyötsiä et al.

[11] Patent Number: 6,155,790
[45] Date of Patent: Dec. 5, 2000

[54] METHOD AND EQUIPMENT FOR CONTROLLING A PIPE NETWORK

[75] Inventors: Jouni Pyötsiä; Mika Kreivi, both of Helsinki, Finland

[73] Assignee: Neles Controls OY, Helsinki, Finland

[21] Appl. No.: 09/154,629

[22] Filed: Sep. 17, 1998

[30] Foreign Application Priority Data

Jun. 1, 1998 [FI] Finland .................................... 981231

[51] Int. Cl.⁷ .................................................. F04B 49/00
[52] U.S. Cl. .................................................. 417/28
[58] Field of Search ..................... 417/28, 26, 43, 417/326, 282, 302, 53

[56] References Cited

U.S. PATENT DOCUMENTS

| | | | |
|---|---|---|---|
| 4,249,570 | 2/1981 | Budzich | 137/596.13 |
| 4,290,449 | 9/1981 | Budzich | 137/596.13 |
| 4,513,696 | 4/1985 | Fujii et al. | 123/41.02 |
| 4,679,492 | 7/1987 | Budzich | 91/420 |
| 4,793,238 | 12/1988 | Budzich | 91/421 |
| 4,799,420 | 1/1989 | Budzich | 91/529 |
| 5,408,708 | 4/1995 | Mathis | 4/541.4 |

FOREIGN PATENT DOCUMENTS

| | | |
|---|---|---|
| 890192318 | 3/1991 | Japan . |
| 2293403 | 3/1996 | United Kingdom . |

*Primary Examiner*—Teresa Walberg
*Assistant Examiner*—Vinod D Patel
*Attorney, Agent, or Firm*—Pillsbury Madison & Sutro LLP

[57] ABSTRACT

A method and equipment for controlling a pipe network comprising piping (1), a pump (2) and at least two control valves (3), whereby the valve position and the flow through the valve are monitored, and in order to achieve desired flows the rotational speed of the pump and the position of each valve are adjusted on the basis to the position and flow data received. The rotational speed of the pump (2) is adjusted to be as low as possible, but at the same time sufficient for maintaining the gain of the valves (3). The positions of the valves (3) are adjusted to be as open as possible, the valve opening being, however, for the major part of the time, not more than a certain predetermined portion of the opening of the totally open position.

23 Claims, 4 Drawing Sheets

METHOD AND EQUIPMENT FOR CONTROLLING A PIPE NETWORK

TECHNICAL FIELD

To many, the processing industry means pumping fluids from one stage of the process to another. A great deal of the energy used by the processing industry is spent for pumping.

Along with the decrease of the size and price of inverters, more and more pumps are provided with inverter control. The field bus technique is becoming more general. Basic ideas of the field bus technique are the control and diagnostics distributed to smart field devices and the communication between the field devices.

DISCLOSURE OF THE INVENTION

The present invention describes a method, by means of which the energy consumption for pumping procedures in the processing industry can be reduced. The implementation of the method is made possible by the increased usage of smart field devices and inverter controlled pumps.

The gist of the present invention is a diagnostic program incorporated in a smart valve. The program has three basic functions. A smart valve includes a control valve having sensors for monitoring the valve position and the flow through the valve, as well as a microprocessor for processing the readings of the sensors.

The primary function of the program is to maintain the installed characteristic curve of the valve. The installed characteristic curve of a valve is a non-linear function of the position data and the flow measurement data of the valve, the parameters of which are updated by the diagnostic program on the basis of the measurement data received. Only that part of the installed characteristic curve can be identified, from which measurement data is continuously available. Maximum and minimum flows $q_{max}$ and $q_{min}$ of the part of the characteristic curve to be identified are adaptively calculated, so that with a great probability, the flow remains between them.

The second function of the program is to conclude whether the rotational speed of the pump should be increased or decreased.

Conditions for reducing the rotational speed are the following: The average slope ratio and the linearity of the part of the installed characteristic curve are greater than certain minimum values. In case the slope ratio is great, the control accuracy of the valve is poor, because due to even a minor increase of the valve opening the flow is increased a good deal. When the rotational speed of the pump is reduced, the valve opening can be increased, and simultaneously a part of the characteristic curve, where the slope ratio is smaller is taken in use.

On the characteristic curve, the valve position corresponding to the $q_{max}$ must be smaller than 95%. The rotational speed is desired to be increased, if the valve position is greater than 95%. A valve position of 100% here means a totally open position. The valve is desired to be kept in a position, where its opening is not more than 95% of the opening of the totally open position, as otherwise there would not be sufficient controlling margin left in the position.

BRIEF DESCRIPTION OF DRAWINGS

The invention and its details will be described in more detail in the following, with reference to the enclosed drawings, wherein.

MODES FOR CARRYING OUT THE INVENTION

Figure 1:
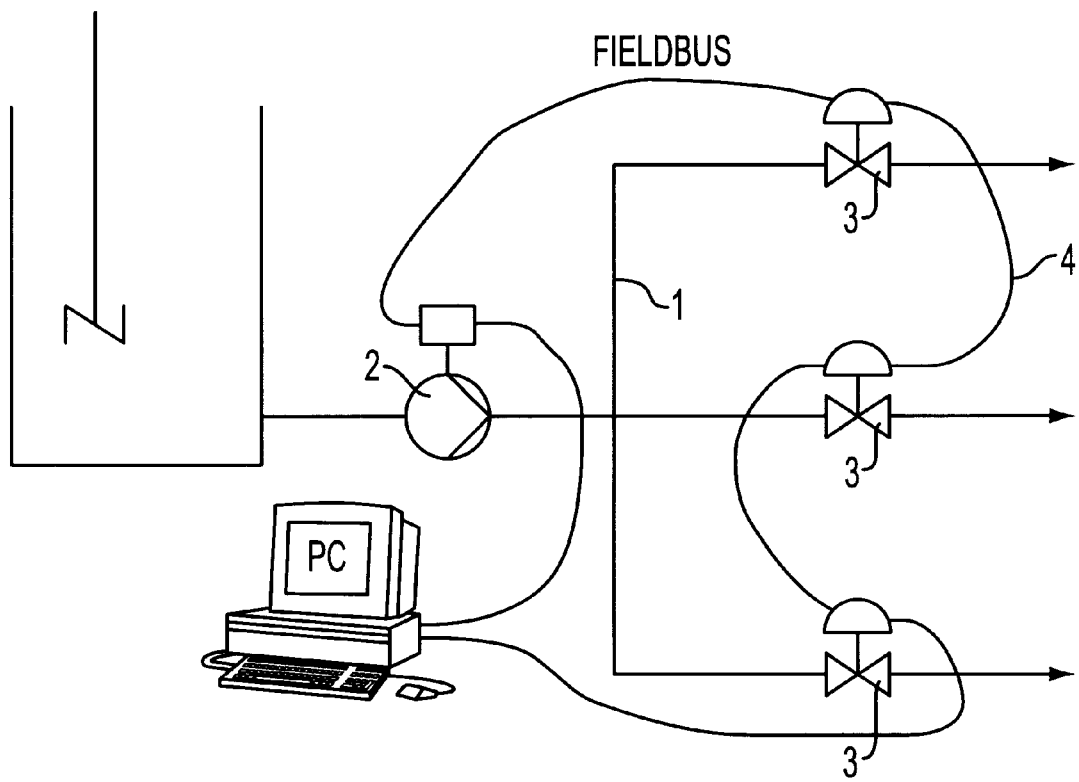
FIG. 1 shows a system to be optimized.

The piping network system to be optimized (FIG. 1) consists of piping 1, an inverter pump 2 and valves 3 after it. The smart valves and the inverter communicate with each other along a field bus 4. The pump is preferably a centrifugal pump. It is driven by a three-phase current motor, the frequency of which is controlled by the inverter. Thus, the rotational speed of the pump can be controlled by means of the inverter. The valves are preferably rotary control valves, such as ball, segment or plug valves. Each valve is provided with a positioner and an actuator.

An optimizing program is arranged into one of the valves, the function of said program being to optimize the rotational speed of the pump so that the control result of the process controllers and the performance of the piping are optimized. The optimizing program receives as inputs the request of each valve to decrease/increase the rotational speed of the pump. If according to the diagnostics of every valve, the rotational speed of the pump should be decreased, it will be decreased, but slowly integrating. In case any of the valves desires to have the rotational speed increased, it will be increased quickly integrating.

The implementation environment is a field bus environment. The field bus in this connection means a field bus applicable to process automation, such as e.g. Fieldbus Foundation, Profibus or Profibus PA busses. The bus can be intended only for the communication between field devices or it can be expressly designed for a distributed field controlling.

Figure 2:
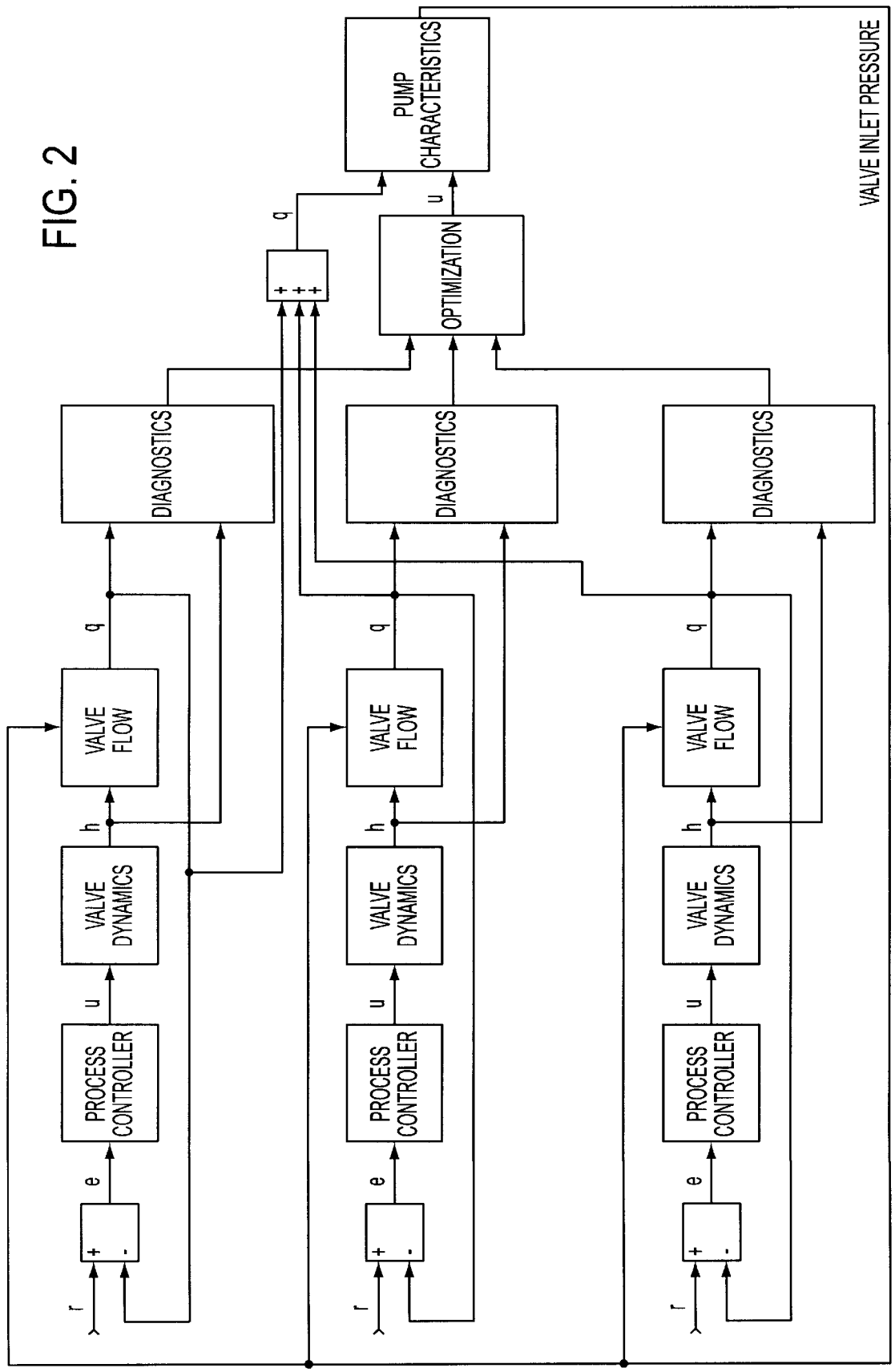
FIG. 2 shows a block diagram of the system.
Figure 3:
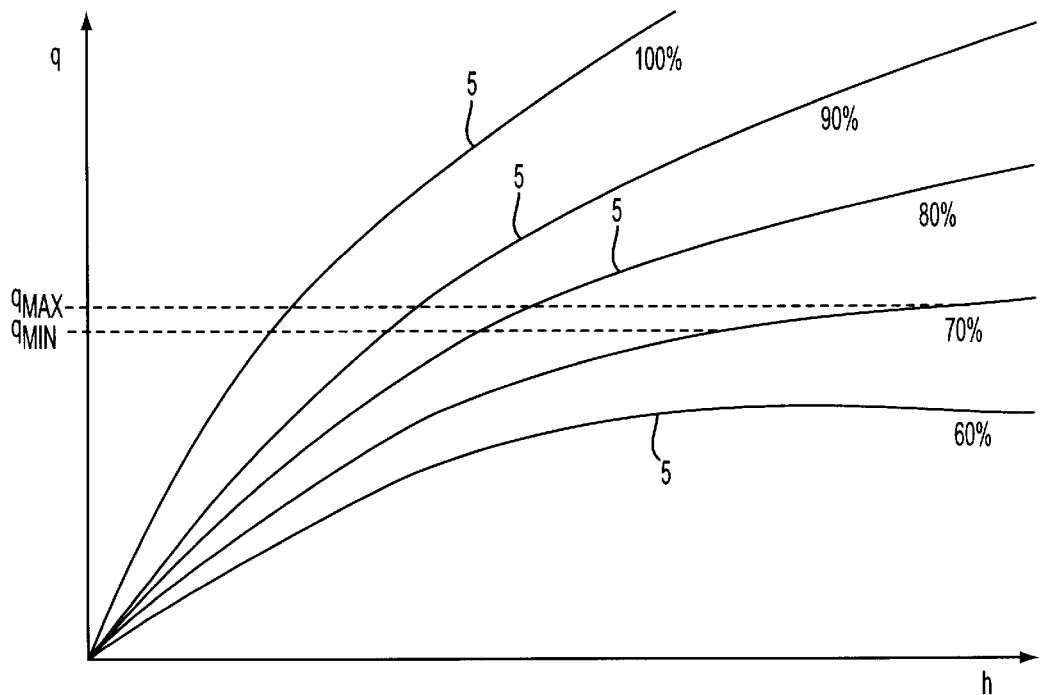
FIG. 3 shows the installed characteristic curves of a valve with rotational speeds of 60 to 100% of a pump.

The block diagram of the system is shown in FIG. 2. The inlet pressures, and thus also the installed characteristic curves of the valves change as a function of the pump characteristic curve of the pump. The pump characteristic curve is dependent on the flow, so that normal variations of the process controllers cause variation also in the installed characteristic curves. In FIG. 2 the references letters refer to the following r=reference, that is set value e=error u=control h=measured position of the valve q=volume flow FIG. 3 illustrates the installed characteristic curves 5 of the valve, that is the relation between the flow q and the valve position h with pump controls of 60 to 100%. Because the characteristic curve of a valve depends on the inlet pressure, a different characteristic curve corresponds to each rotational speed of the pump. It is assumed that at the initial situation the pump control is 100%, in other words the pump runs with the maximum rotational speed. Then the average position of the valve is about 30% of the totally open position, that means that the valve is opened only a little. Effected by the above described optimizing program, the system, however, ends up in a final state, where the pump control is 70% of the maximum rotational speed and the average position of the valve is about 75%. It can be seen that within the area of the characteristic curve corresponding to the pump control of 70%, the slope ratio of the curve is small, so that the control accuracy of the valve is good, in other words, the change of the flow caused by the change of the valve position is small compared with other areas of the same characteristic curve as well as with other characteristic curves. On the other hand, at the corresponding point of the characteristic curve corresponding to the pump control of 60%, it is no more possible to affect the flow at all by changing the valve position.

So, the described system provides two significant advantages: the energy consumption required for the pumping is decreased and the control accuracy of the valves is increased. In a pump, electric energy is changed via kinetic energy into a pressure difference. In a valve, a part of this pressure difference is changed into heat and noise. The more open the valve is, the less pressure difference will be wasted therein. The optimizing system tends to reduce the rotational speed of the pump into its optimal minimum, and thereby the opening angles of the valves of the pipe network are increased, so that the energy consumption required for pumping is decreased. In the method in accordance with the invention, energy is not unnecessarily used first for increasing the pressure unnecessarily high by means of the pump, after which it would be necessary to decrease the flow by using a small opening angle of the valve.

The effect of the nonlinearities of the valve, such as hysteresis and seepage oscillating, on the variable to be controlled is directly proportional to the valve gain, that is to the change of the flow caused by the change of the valve position. Due to the optimizing system, the rotational speed of the pump decreases and the gains of the valves of the pipe network decrease, so that the control accuracy of the valves will be improved, as the nonlinearities have less effects.

Most process controllers presume that the gain of the process to be controlled is constant. In order to guarantee the optimal operation, the gains of the process controllers can be changed on the basis on the gains calculated from the characteristic curves of the valves.

An additional pressure measurement can be provided on the pressure side of the pump. The pressure measurement can be used for assisting in the identification of the installed characteristic curve.

In the simplest case, instead of the identification of the installed characteristic curve of the valve, a static target value can be given to the average position of the valve. In that case a position is determined, where the valve is desired to be set, controlled by the program. The target value can be e.g. 90% of the totally open position, and the pump is controlled in order to achieve this.

Instead of identifying the installed characteristic curve of the valve, the gain of the valve can be identified on-line. The gain of the valve is determined by a formula $$G = \frac{\Delta q}{\Delta h} \cdot \frac{100}{(q_{max} - q_{min})}, \quad (1)$$

wherein q is the flow and h is the measured valve position.

Figure 4:
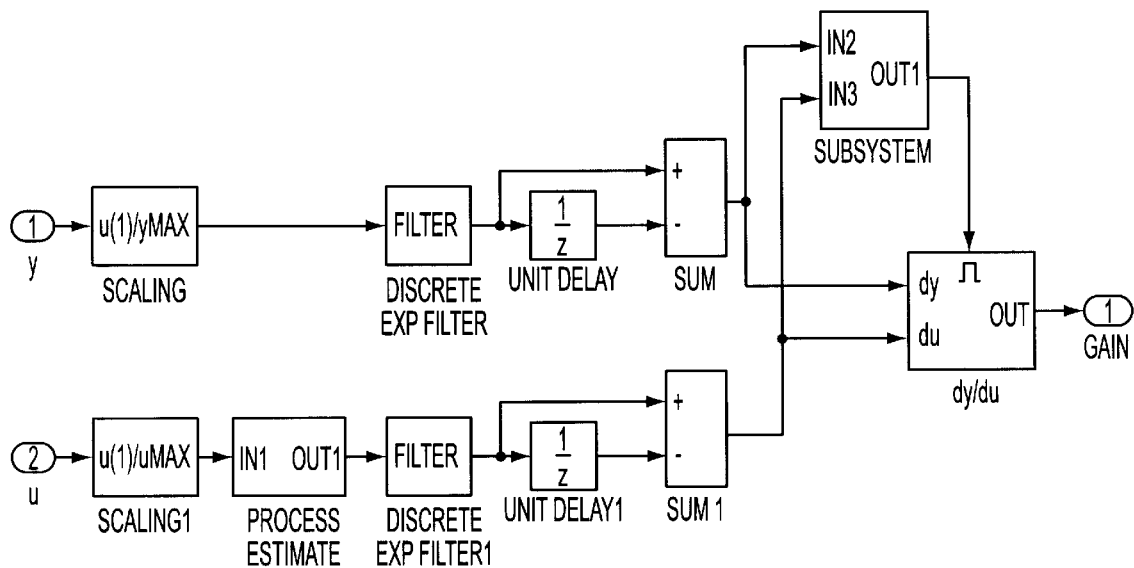
FIG. 4 shows the on-line identification of the valve gain.

FIG. 4 illustrates the principle of the on-line identification of the gain of the valve.

Figure 5:
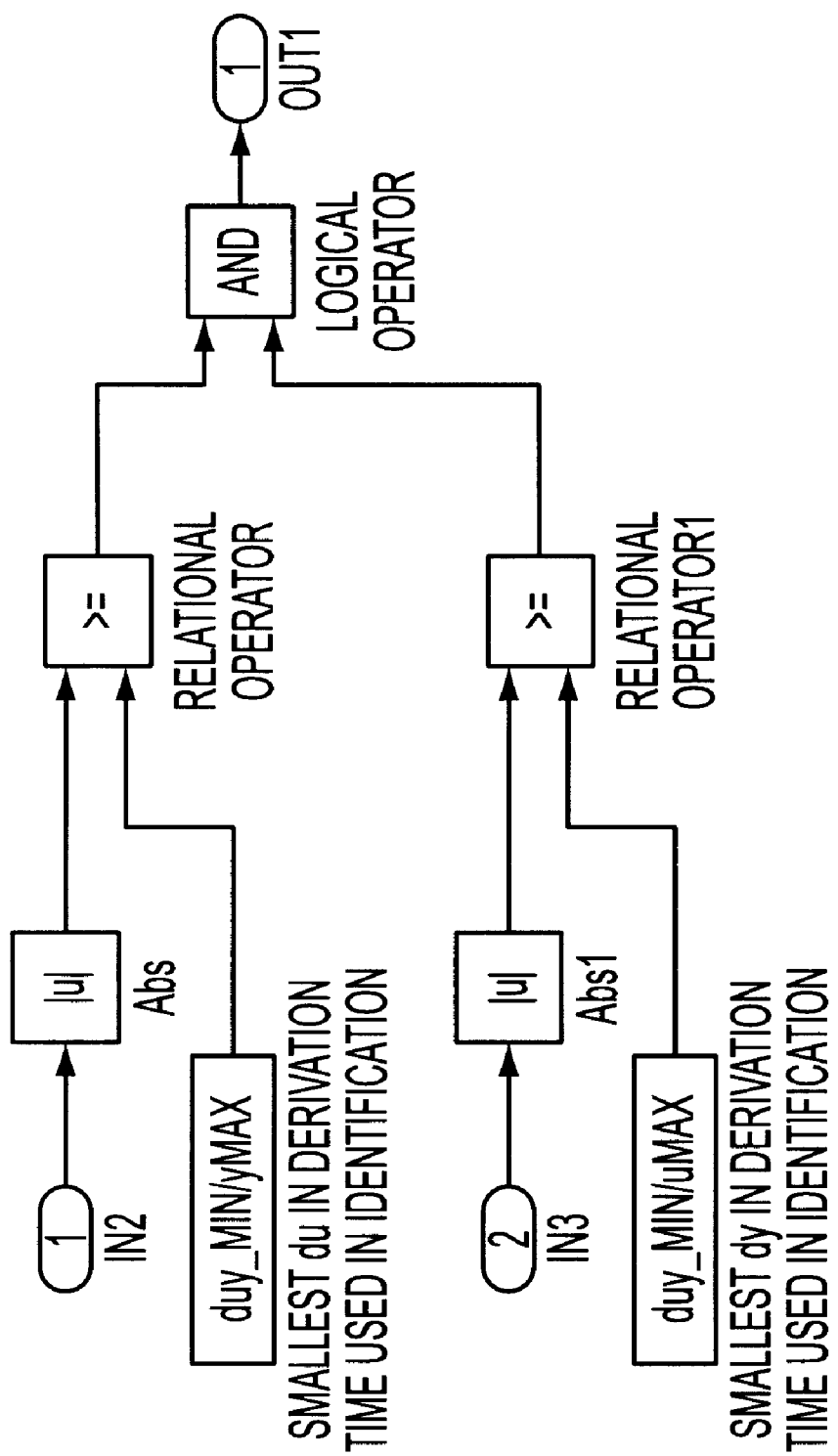
FIG. 5 shows the contents of one block of FIG. 4.

The blocks Scaling and Scaling 1 normalize the values of variables y and u. Here y corresponds to the flow measurement and u the valve position. The block Process estimate is a common estimate of the dynamics of the flow measurement and the flow. The estimate is the discrete transmission function of the first order and the dead time. Discrete exp filter and exp filter 1 are exponential filters of the first order, the filters are copies of each other. Thereby the changes in the gains and offsets caused by the filters affect in the same way on both of the measurement signals. Derivatives of the signals are calculated by the blocks Unit delay and Sum, and the gain according to formula 1 is calculated by the block dy/du, and in addition, it is filtered by a filter of a substantial time constant. By the block Subsystem, the performance of the block dy/du is either enabled or frozen. FIG. 5 shows the contents of the block Subsystem.

The block dy/du is performed if the values of the derivatives of both signals are greater than or equal to the normalized minimum value common to the signals.

Calculation of the ratio of the derivatives according to the formula 1 requires rather good measurements and well filtered signals. Sufficiently good filtering is achieved only by using sufficiently short sampling periods. Additionally, the flow dynamics of the valve and the dynamics of the flow measurement are rather fast phenomenons, time constant being around 0.1 to 2 seconds. Due to these facts, the sampling frequency of the described identification would have to be around 30 to 100 Hz.

The identification method can be used, besides for the optimizing of the performance, also for other purposes, such as on-line collecting of diagnostic data of a valve, whereby it is possible e.g. to estimate, whether the valve is over- or undersized.

What is claimed is:

1. A method for controlling a pipe network for transporting a fluid from one location to at least another location, said pipe network comprising piping for transporting the fluid from the one location to at least another location, a pumping assembly connected to the piping for driving the fluid through the piping, and at least two control valve assemblies connected to the piping for controlling the amount of fluid flowing through the piping, said method comprising the steps of:

monitoring at least one of the flow of fluid through each of the at least two valve assemblies and the valve position of each of the at least two valve assemblies; and adjusting a rotational speed of the pumping assembly and the valve position of each of the at least two valve assemblies in response to said monitoring of at least one of the flow of fluid through each of the at least two valve assemblies and the valve position of each of the at least two valve assemblies in order to achieve a desired fluid flow through the pipe network.

2. The method for controlling the pipe network according to claim 1, wherein said step of adjusting the rotational speed of the pumping assembly includes optimizing the rotational speed of the pumping assembly to maintain valve gain.

3. The method for controlling the pipe network according to claim 1, wherein each of the at least two valve assemblies has a fully open position, wherein said step of adjusting the rotational speed of the pumping assembly includes increasing the rotational speed of the pumping assembly when at least one valve assembly has a valve position greater than a predetermined portion of the fully open position.

4. The method for controlling the pipe network according to claim 1, wherein said step of adjusting the valve position of each of the at least two valve assemblies includes optimizing the valve opening of each of the at least two valve assemblies.

5. The method for controlling the pipe network according to claim 4, wherein each of the at least two valve assemblies has a fully open position, wherein said step of optimizing the valve opening of each of the at least two valve assemblies includes opening each of the at least two valve assemblies to less than the fully open position.

6. The method for controlling the pipe network according to claim 1, further comprising the step of measuring the pressure of the fluid on a pressure side of the pumping assembly.

7. The method for controlling the pipe network according to claim 6, further comprising the step of identifying a characteristic operating curve for each of the at least two valve assemblies based upon the measured pressure of the fluid.

8. The method for controlling the pipe network according to claim 7, wherein said step of adjusting the rotational speed of the pumping assembly and the valve position of each of the at least two valve assemblies includes adjusting the rotational speed of the pumping assembly to maintain the characteristic operating curve for each of the at least two valve assemblies.

9. The method for controlling the pipe network according to claim 8, wherein the rotational speed of the pump is decreased when an average slope ratio of a part of the characteristic operating curve is greater than a predetermined value.

10. The method for controlling the pipe network according to claim 8, wherein each of the at least two valve assemblies has a fully open position, wherein said step of adjusting the rotational speed of the pumping assembly includes increasing the rotational speed of the pumping assembly when at least one valve assembly has a valve position greater than a predetermined portion of the fully open position.

11. The method for controlling the pipe network according to claim 8, wherein said step of adjusting at least one of a rotational speed of the pumping assembly and the valve position of each of the at least two valve assemblies includes adjusting the valve position of each of the at least two valve assemblies to maintain the characteristic operating curve for each of the at least two valve assemblies.

12. The method for controlling the pipe network according to claim 1, further comprising the step of identifying a characteristic operating curve for each of the at least two valve assemblies based upon at least one of the monitored flow of fluid through each of the at least two valve assemblies and the valve position of each of the at least two valve assemblies.

13. The method for controlling the pipe network according to claim 12, wherein said step of adjusting at least one of a rotational speed of the pumping assembly and the valve position of each of the at least two valve assemblies includes adjusting the rotational speed of the pumping assembly to maintain the characteristic operating curve for each of the at least two valve assemblies.

14. The method for controlling the pipe network according to claim 13, wherein the rotational speed of the pump is decreased when an average slope ratio of a part of the characteristic operating curve is greater than a predetermined value.

15. The method for controlling the pipe network according to claim 13, wherein each of the at least two valve assemblies has a fully open position, wherein said step of adjusting the rotational speed of the pumping assembly includes increasing the rotational speed of the pumping assembly when at least one valve assembly has a valve position greater than a predetermined portion of the fully open position.

16. The method for controlling the pipe network according to claim 12, wherein said step of adjusting at least one of a rotational speed of the pumping assembly and the valve position of each of the at least two valve assemblies includes adjusting the valve position of each of the at least two valve assemblies to maintain the characteristic operating curve for each of the at least two valve assemblies.

17. A system for controlling a pipe network for transporting a fluid from one location to at least another location, said pipe network comprising piping for transporting the fluid from the one location to at least another location, a pumping assembly connected to the piping for driving the fluid through the piping, and at least two control valve assemblies connected to the piping for controlling the amount of fluid flowing through the piping, said system comprising:
  a monitoring assembly for sensing at least one of the flow of fluid through each of the at least two valve assemblies and the valve position of each of the at least two valve assemblies; and
  a control assembly for adjusting a rotational speed of the pumping assembly and the valve position of each of the at least two valve assemblies in response to at least one of the sensed flow of fluid through each of the at least two valve assemblies and the sensed valve position of each of the at least two valve assemblies in order to achieve a desired fluid flow through the pipe network.

18. The system according to claim 17, wherein said control assembly adjusts and optimizes the rotational speed of the pumping assembly.

19. The system according to claim 18, wherein each of the at least two valve assemblies has a fully open position, wherein said control assembly increases the rotational speed of the pumping assembly when at least one valve assembly has a valve position greater than a predetermined portion of the fully open position.

20. The system according to claim 18, wherein said control assembly adjusts and optimizes the valve position of each of the at least two valve assemblies.

21. The system according to claim 20, wherein each of the at least two valve assemblies, has a fully open position, wherein said control assembly opens each of the at least two valve assemblies to less than the fully open position.

22. The system according to claim 17, wherein said monitoring assembly includes a sensor for each of the at least two valve assemblies.

23. The system according to claim 17, wherein said control assembly includes an inverter for controlling the rotational speed of the pumping assembly.

* * * * *